United States Patent
Zhang et al.

(10) Patent No.: US 10,778,807 B2
(45) Date of Patent: Sep. 15, 2020

(54) SCHEDULING CLUSTER RESOURCES TO A JOB BASED ON ITS TYPE, PARTICULAR SCHEDULING ALGORITHM, AND RESOURCE AVAILABILITY IN A PARTICULAR RESOURCE STABILITY SUB-LEVELS

(71) Applicant: BEIJING BAIDU NETCOM SCIENCE AND TECHNOLOGY CO., LTD., Beijing (CN)

(72) Inventors: Muhua Zhang, Beijing (CN); Xianjun Meng, Beijing (CN); Ru Ying, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 170 days.

(21) Appl. No.: 15/862,529

(22) Filed: Jan. 4, 2018

(65) Prior Publication Data

US 2018/0191861 A1 Jul. 5, 2018

(30) Foreign Application Priority Data

Jan. 4, 2017 (CN) .......................... 2017 1 0005566

(51) Int. Cl.
*H04L 29/08* (2006.01)
*G06F 9/48* (2006.01)
*G06F 9/50* (2006.01)

(52) U.S. Cl.
CPC ............ *H04L 67/32* (2013.01); *G06F 9/4881* (2013.01); *G06F 9/5027* (2013.01); *H04L 67/322* (2013.01)

(58) Field of Classification Search
CPC ..... G06F 9/4881; G06F 9/5027; H04L 67/32; H04L 67/322
See application file for complete search history.

(56) References Cited

U.S. PATENT DOCUMENTS

| 8,140,791 B1 * | 3/2012 | Greene ............... G06F 11/1464 711/162 |
| 2011/0307899 A1 * | 12/2011 | Lee ....................... G06F 9/5027 718/104 |

(Continued)

FOREIGN PATENT DOCUMENTS

| CN | 103701894 A | 4/2014 |
| CN | 104657205 A | 5/2015 |
| CN | 104869154 A | 8/2015 |

*Primary Examiner* — Jorge A Chu Joy-Davila
(74) *Attorney, Agent, or Firm* — Marshall, Gerstein & Borun LLP

(57) ABSTRACT

An objective of the present disclosure is to provide a method and apparatus for scheduling resources in a cloud system. The method according to the present disclosure comprises steps of: determining, according to stability of computing resources in the cloud system, respective resource priority levels of the respective computing resources; determining a scheduling algorithm corresponding to a current job when it is needed to schedule the resources; and allocating the resources based on the scheduling algorithm and resource priority levels of currently available respective computing resources. Compared with the prior art, the present disclosure has the following advantages: by differentiating the priorities of the computing resources and supporting a plurality of scheduling algorithms, resource scheduling is performed based on a variety of scheduling algorithms and resource priorities, which enhances the flexibility of resource scheduling and enhances the resource utilization and system throughput.

9 Claims, 2 Drawing Sheets

(56) References Cited

U.S. PATENT DOCUMENTS

Figure 1:
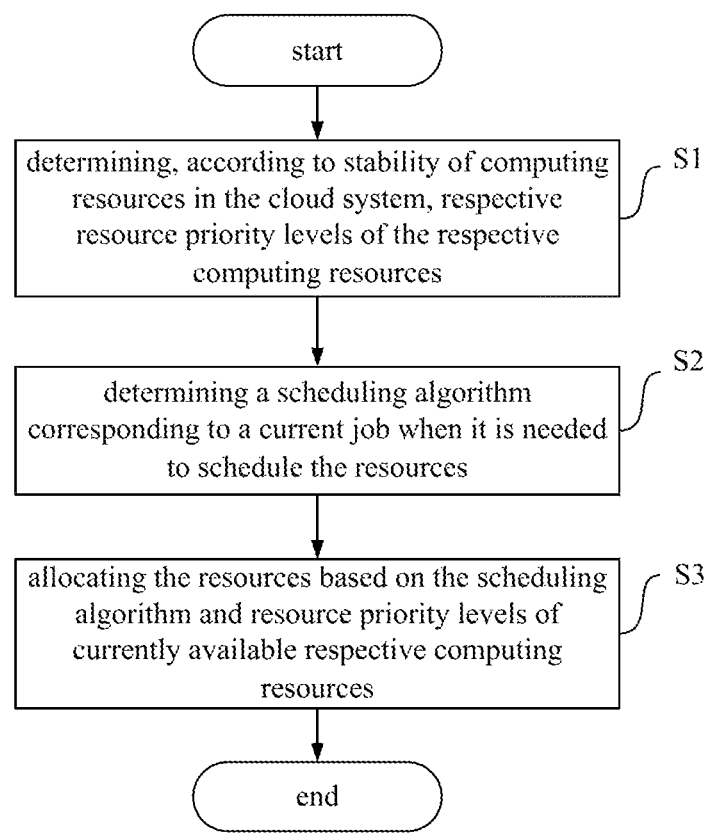

| | | | | |
|---|---|---|---|---|
| 2013/0023274 A1* | 1/2013 | Meredith | .............. | H04W 48/18 |
| | | | | 455/450 |
| 2013/0117752 A1* | 5/2013 | Li | ........................ | G06F 9/5066 |
| | | | | 718/102 |
| 2015/0236977 A1* | 8/2015 | Terayama | .............. | G06F 9/5077 |
| | | | | 709/224 |
| 2017/0024256 A1* | 1/2017 | Mukherjee | ............ | G06F 9/5005 |

* cited by examiner

SCHEDULING CLUSTER RESOURCES TO A JOB BASED ON ITS TYPE, PARTICULAR SCHEDULING ALGORITHM, AND RESOURCE AVAILABILITY IN A PARTICULAR RESOURCE STABILITY SUB-LEVELS

CROSS REFERENCE TO RELATED APPLICATIONS

This present disclosure claims priority to Chinese patent application No. 201710005566.7 filed on Jan. 4, 2017 entitled "Method and Apparatus for Scheduling Resources in a Cloud System," the contents of which will be incorporated herein by reference in its entirety.

FIELD OF THE INVENTION

The present disclosure generally relates to the field of computer technologies, and more particularly to a method and apparatus for scheduling resources in a cloud system.

BACKGROUND OF THE INVENTION

With the development of information technologies, cloud computation has been permeated in various aspects of computing fields. Due to demands of sharing data locally and off-peak running resources, there is a trend that different computing frameworks are uniformed onto a Platform as a Service (PaaS) platform.

Based on the solution of the prior art, a scheduler in the cloud system only describes generally the size of the resource amount, without describing computation capabilities and stabilities of different machines; moreover, a scheduler based on the prior art usually only supports one scheduling algorithm and performs resource allocation based on the scheduling algorithm. Mixing of different computation frameworks has the following requirements on the scheduler:

1) different machines have different computation capabilities and stabilities, such that it is required to classify computation efficiencies of different machine resources, e.g., exclusive disks and shared disks (or single disks), 10-gigabit network card and gigabit network card, etc.;

2) it is needed to formulate different scheduling algorithms for different jobs. For example, BestFit allocation algorithm is exploited for Message Passing Interface (MPI) jobs, while NextFit or WorstFit allocation algorithm is exploited for MR and most batch processing jobs.

3) It is needed to distinguish resource levels used by jobs with different delay sensitivities: for example, a high-priority MR (MapReduce) job needs to use a resource of a higher priority to prevent job instability due to too high running avoidance rate on a single chip machine.

However, the solution based on the prior art cannot satisfy the requirements above due to supporting a single scheduling algorithm and a machine resource description mode.

SUMMARY OF THE INVENTION

An objective of the present disclosure is to provide a method and apparatus for scheduling resources in a cloud system.

According to one aspect of the present disclosure, there is provided a method for scheduling resources in a cloud system, the method comprising:

determining, according to stability of computing resources in the cloud system, respective resource priority levels of the respective computing resources;

wherein the method comprises:

determining a scheduling algorithm corresponding to a current job when it is needed to schedule the resources; and allocating the resources based on the scheduling algorithm and resource priority levels of currently available respective computing resources.

According to one aspect of the present invention, there is provided a scheduling apparatus for scheduling resources in a cloud system, the scheduling apparatus comprising:

a module configured to determine, according to stability of computing resources in the cloud system, respective resource priority levels of the respective computing resources;

wherein the scheduling apparatus comprises:

a module configured to determine a scheduling algorithm corresponding to a current job when it is needed to schedule the resources; and a module configured to allocate the resources based on the scheduling algorithm and resource priority levels of currently available respective computing resources.

Compared with the prior art, the present disclosure has the following advantages: by differentiating the priorities of the computing resources and supporting a plurality of scheduling algorithms, resource scheduling is performed based on a variety of scheduling algorithms and resource priorities, which enhances the flexibility of resource scheduling and enhances the resource utilization and system throughput; moreover, in the case of mixing different computation frameworks, resource scheduling may be performed in different computation frameworks based on a specific scheduling algorithm, so as to satisfy a plurality of scheduling demands; moreover, resource scheduling is conducted through interaction with a remote scheduler, which facilitates users to use a special scheduling algorithm to perform resource scheduling, further improving the flexibility of scheduling the resource.

BRIEF DESCRIPTION OF THE ACCOMPANYING DRAWINGS

The other features, objectives, and advantages of the present disclosure will become more apparent by reading the detailed depiction of the non-limiting embodiments with reference to the accompanying drawings.

Figure 2:
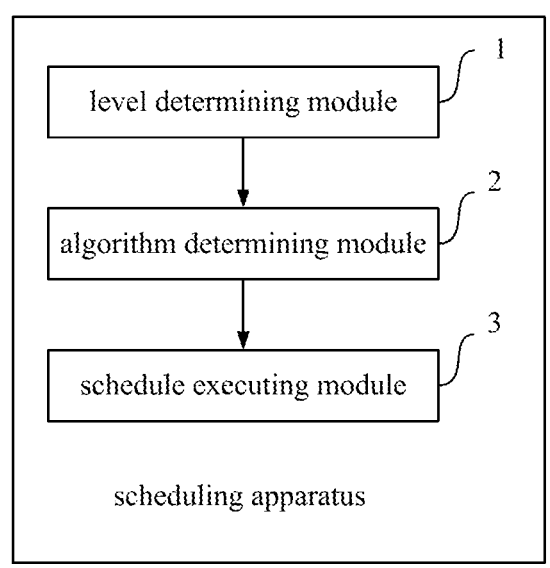

FIG. 1 schematically illustrates a flow diagram of a method for scheduling resources in a cloud system according to the present disclosure;

FIG. 2 schematically illustrates a structural diagram of a scheduling apparatus for scheduling resources in a cloud system according to the present disclosure.

Throughout the drawings, the same or corresponding reference numerals represent the same or corresponding parts.

DETAILED DESCRIPTION OF THE PREFERRED EMBODIMENTS

Hereinafter, the present disclosure will be described in further detail with reference to the accompanying drawings.

FIG. 1 schematically illustrates a flow diagram of a method for scheduling resources in a cloud system according to the present disclosure. The method according to the present disclosure comprises step S1, step S2, and step S3.

In one embodiment, the method according to the present disclosure is implemented through a scheduling apparatus included in a computer device. The computer device comprises an electronic device that may automatically perform numerical value computation and/or information processing according to preset or stored instructions, hardware of which electronic device includes, but not limited to, a microprocessor, an application-specific integrated circuit (ASIC), a programmable gate array (FPGA), a digital processor (DSP), an embedded device, and etc. The computer device comprises a network device. Particularly, the network device includes, but not limited to, a single network server, a server group consisting of a plurality of network servers, or a cloud consisting of a large number of computers or network servers based on cloud computing (the cloud computing is a kind of distributed computing), and a super virtual computer consisting of a group of loosely coupled computer clusters.

Preferably, the scheduling apparatus is configured for scheduling the computing resources in the cloud system.

Particularly, the network where the user equipment and the network device are located includes the Internet, a Wide Area Network, a Metropolitan Area Network, a VPN network, and etc.

It needs to be noted that the user equipment, the network device, and the network are only examples; other existing or future possibly emerging user equipment, network device, and network, if applicable to the present disclosure, should also be included within the protection scope of the present disclosure, which are incorporated here by reference.

Referring to FIG. 1, in step S1, the scheduling apparatus determines, according to stability of computing resources in the cloud system, respective resource priority levels of the respective computing resources.

In one embodiment, the computing resources include various kinds of machines or devices that may work in a cloud system.

Preferably, the resource priority employed by the cloud system is determined by first executing step S4 (not shown) according to the method of the present disclosure.

In step S4, the scheduling apparatus differentiates the computing resources into two levels: stable and unstable, based on the stability of the computing resources, and further categorize the two levels, thereby obtain respective resource priority levels corresponding to the stable and unstable levels.

Particularly, the stability of the computing resources is for indicating running efficiency of the computing resources, wherein the higher the running efficiency of a computing resource is, the higher the priority level of the computing efficiency is.

In step S1, the scheduling apparatus determines respective resource priority levels of respective computing resources according to the priority of the resource employed by the cloud system based on relevant data for indicating stability of the computing resources. Wherein the scheduling apparatus may retrieve various data that may reflect the stability of the computing resources, e.g., the device hardware specification or calculation speed obtained from statistics; those skilled in the art may select appropriate data based on actual needs.

According to a first example of the present disclosure, the scheduling apparatus is included in a scheduler of a cloud system. the scheduling apparatus differentiates the resources into two levels: Stable and Unstable, based on the relevant data indicating the computation instability, and further categorize the Stable and Unstable levels into three sub-levels, respectively, according to the degree of stability, resulting in 6 resource priorities employed by the scheduling apparatus: STABLE_P0, STABLE_P1, and STABLE_P2 corresponding to "Stable," and UNSTABLE_P0, UNSTABLE_P1, and UNSTABLE_P2 corresponding to "Unstable," wherein the priority sequence increments in an order of P2, P1, and P0; then the 6 resource priorities are sorted in a descending order as such: STABLE_P0>STABLE_P1>STABLE_P2> UNSTABLE_P0>UNSTABLE_P1>UNSTABLE_P2. The scheduling apparatus determines respective resource priorities of respective computing resources.

It needs to be noted that the example above is only for better illustrating the technical solution of the present disclosure, not for limiting the present disclosure. Those skilled in the art should understand that any implementation manner of determining, according to stability of computing resources in the cloud system, respective resource priority levels of the respective computing resources, should be included within the scope of the present disclosure.

Preferably, the scheduling apparatus may also determine the resource priorities of the computing resources based on the priority levels of the jobs executed by the computing resources, such that the higher the priority level of a job is, the higher the resource priority of the corresponding computing resource is.

Continue referring to FIG. 1. In step S2, when it is needed to schedule resources, the scheduling apparatus determines a scheduling algorithm corresponding to the current job.

Particularly, the scheduling algorithm includes various kinds of algorithms for scheduling the computing resources based on a specific scheduling need.

Specifically, the scheduling apparatus determines a scheduling algorithm corresponding to the current job based on correspondence relationships between a plurality of scheduling algorithms and job types.

Preferably, the scheduling apparatus determines, based on a scheduling demand corresponding to a current job, determining a scheduling algorithm corresponding to the job.

For example, the MPI job requires a BestFit allocation algorithm so as to save a larger space to place a request for a next computing resource; while for an MR (Map Reduce) job, the NextFit or WorstFit allocation algorithm is employed to break up for even scheduling, so as to achieve better resource utilization.

It needs to be noted that the example above is only for better illustrating the technical solution of the present disclosure, not for limiting the present disclosure. Those skilled in the art should understand that any implementation manner of determining the scheduling algorithm corresponding to the current job when it is needed to schedule resources should be included in the scope of the present disclosure.

Next, in step S3, the scheduling apparatus allocates the resources based on the scheduling algorithm and resource priority levels of currently available respective computing resources.

Preferably, when allocating the resources, the scheduling apparatus assigns the jobs to be executed in high quality computing resources with higher resource priority levels.

Preferably, if the amount of currently available high quality computing resources is relatively small, the scheduling apparatus may assign the jobs to be executed in computing resources with relatively lower resource priority levels, so as to achieve a higher system throughput.

Continue explaining the first example. The currently available computing resources are computing resources with two resource priorities: Stable_P0 and Unstable_P0; then the scheduling apparatus determines that the computing resource of Stable_P0 is a relatively higher quality resource and assigns the jobs to be executed in the computing resource Stable_P0. If the amount of high quality resources is less than a predetermined threshold, the scheduling apparatus assigns the jobs to be executed in the computing resource Unstable_P0, so as to achieve a higher resource amount and the throughput.

It needs to be noted that the example above is only for better illustrating the technical solution of the present disclosure, not for limiting the present disclosure. Those skilled in the art should understand that any implementation manner of allocating resources based on the scheduling algorithm and the resource priority levels of the respective computing resources currently available should be included in the scope of the present disclosure.

Preferably, the scheduling apparatus backs up in advance one or more jobs to be executed in a computing resource of an unstable level to other computing resources of stable level for execution.

The operation of backing up in advance is for simultaneously running two instances on a certain fragment of a task so as to prevent a slow node from slowing down the progress of the whole job.

Continuing explaining the first example, to prevent that a slow running task running on the Unstable_P0 resource causes the whole job unable to be completed, the scheduling apparatus backs up in advance a part of the to-be-executed job in Unstable_P0 to the computing resource of Stable_P0, Stable_P1 or Stable_P2 for execution.

According to the method of the present disclosure, by differentiating the priorities of the computing resources and supporting a plurality of scheduling algorithms, resource scheduling is performed based on the variety of scheduling algorithms and resource priorities, which enhances the flexibility of resource scheduling and improves the resource utilization and system throughput.

According to a preferred embodiment of the present disclosure, different computing frames are mixed in the cloud computing system. The method comprises step S5 (not shown) and step S6 (not shown).

In step S5, the scheduling apparatus determines resource scheduling rules corresponding to respective computing frames.

Wherein, the resource scheduling rules are for indicating the scheduling algorithms employed by a plurality of jobs, respectively.

In step S6, when it is needed to schedule resources, the scheduling apparatus allocates resources based on their respective resource scheduling rules and the resource priority levels of the currently available respective computing resources in different computing frameworks, respectively.

Preferably, the scheduling apparatus may determine the classification manners of the resource priorities based on factors like importance or time-delay sensitivity degree in different computing frameworks, thereby performs scheduling according to the resource priority classifications corresponding to the computing frameworks in different computing frames.

According to the method of the present embodiment, in the case of mixing different computing frameworks, resource scheduling may be performed based on specific scheduling algorithms in the different computing frameworks, so as to satisfy a plurality of scheduling needs.

According to a preferred embodiment of the present disclosure, the method comprises step S7 (not shown) and step S8 (not shown).

In step S7, the scheduling apparatus transmits the resource-related information and job information of the available computing resources to a remote scheduler.

Particularly, the resource-related information includes respective information related to the available computing resources, e.g., the resource priority levels of the available computing resources, the amount of available computing resources, or hardware information of the computing resources, etc.

In step S8, the scheduling apparatus receives scheduling result information fed back by the remote scheduler, so as to perform corresponding resource allocation based on the scheduling result information.

Preferably, the scheduling apparatus executes the operations of step S7 and step S8 based on user settings, the remote scheduler being included in the device where the user locates.

For example, for user user_1 of the cloud system, the user sets a special scheduling algorithm for his own. For a job of a general user, the scheduling apparatus executes it using a built-in scheduling algorithm; while when it is needed to execute the task corresponding to the user user_1, the scheduling apparatus transmits the resource-related information and job information of the currently available computing resources to the device where the user_1 is located through a remote RPC scheduling interface, and receives the scheduling result information fed back, so as to allocate corresponding resources based on the scheduling result information.

By scheduling resources through interaction with the remote scheduler, the method according to the present embodiment facilitates the user to use a special scheduling algorithm for resource scheduling, which further enhances the flexibility of resource scheduling.

FIG. 2 schematically illustrates a structural diagram of a scheduling apparatus for scheduling resources in a cloud system according to the present disclosure.

The apparatus for scheduling resources in a cloud system according to the present embodiment includes a module (hereinafter referred to as "level determining module 1") configured to determine, according to stability of computing resources in the cloud system, respective resource priority levels of the respective computing resources; a module (hereinafter referred to as "algorithm determining module 2") configured to determine a scheduling algorithm corresponding to a current job when it is needed to schedule the resources; a module (hereinafter referred to as "schedule executing module 3") configured to allocate the resources based on the scheduling algorithm and resource priority levels of currently available respective computing resources.

Level determining module 1 determines, according to stability of computing resources in the cloud system, respective resource priority levels of the respective computing resources.

The computing resources include various kinds of machines or devices that may work in a cloud system.

Preferably, the scheduling apparatus further comprises a module (not shown, hereinafter referred to as "categorizing module") configured to differentiate the computing resources into two levels: stable and unstable, based on the stability of the computing resources, and further categorize the two levels, thereby obtain respective resource priority levels corresponding to the stable and unstable levels.

The categorizing module differentiates the computing resources into two levels: stable and unstable, based on the stability of the computing resources, and further categorize the two levels, thereby obtain respective resource priority levels corresponding to the stable and unstable levels.

Particularly, the stability of the computing resources is for indicating running efficiency of the computing resources, wherein the higher the running efficiency of a computing resource is, the higher the priority level of the computing efficiency is.

The level determining module 1 determines respective resource priority levels of respective computing resources according to the priority of the resource employed by the cloud system based on relevant data for indicating stability of the computing resources. Wherein the scheduling apparatus may retrieve various data that may reflect the stability of the computing resources, e.g., the device hardware specification or calculation speed obtained from statistics; those skilled in the art may select appropriate data based on actual needs.

According to a first example of the present disclosure, the scheduling apparatus is included in a scheduler of a cloud system. the categorizing module differentiates the resources into two levels: Stable and Unstable, based on the relevant data indicating the computation instability, and further categorize the Stable and Unstable levels into three sub-levels, respectively, according to the degree of stability, resulting in 6 resource priorities employed by the scheduling apparatus: STABLE_P0, STABLE_P1, and STABLE_P2 corresponding to "Stable," and UNSTABLE_P0, UNSTABLE_P1, and UNSTABLE_P2 corresponding to "Unstable," wherein the priority sequence increments in an order of P2, P1, and P0; then the 6 resource priorities are sorted in a descending order as such: STABLE_P0>STABLE_P1>STABLE_P2> UNSTABLE_P0>UNSTABLE_P1>UNSTABLE_P2. The level determining module 1 determines respective resource priorities of respective computing resources.

It needs to be noted that the example above is only for better illustrating the technical solution of the present disclosure, not for limiting the present disclosure. Those skilled in the art should understand that any implementation manner of determining, according to stability of computing resources in the cloud system, respective resource priority levels of the respective computing resources, should be included within the scope of the present disclosure.

Preferably, the level determining module 1 may also determine the resource priorities of the computing resources based on the priority levels of the jobs executed by the computing resources, such that the higher the priority level of a job is, the higher the resource priority of the corresponding computing resource is.

Continue referring to FIG. 2. When it is needed to schedule resources, the algorithm determining module 2 determines a scheduling algorithm corresponding to the current job.

Particularly, the scheduling algorithm includes various kinds of algorithms for scheduling the computing resources based on a specific scheduling need.

Specifically, the algorithm determining module 2 determines a scheduling algorithm corresponding to the current job based on correspondence relationships between a plurality of scheduling algorithms and job types.

Preferably, the algorithm determining module 2 determines, based on a scheduling demand corresponding to a current job, determining a scheduling algorithm corresponding to the job.

For example, the MPI job requires a BestFit allocation algorithm so as to save a larger space to place a request for a next computing resource; while for an MR (Map Reduce) job, the NextFit or WorstFit allocation algorithm is employed to break up for even scheduling, so as to achieve better resource utilization.

It needs to be noted that the example above is only for better illustrating the technical solution of the present disclosure, not for limiting the present disclosure. Those skilled in the art should understand that any implementation manner of determining the scheduling algorithm corresponding to the current job when it is needed to schedule resources should be included in the scope of the present disclosure.

Next, schedule executing module 3 allocates the resources based on the scheduling algorithm and resource priority levels of currently available respective computing resources.

Preferably, when allocating the resources, the schedule executing module 3 assigns the jobs to be executed in high quality computing resources with higher resource priority levels.

Preferably, if the amount of currently available high quality computing resources is relatively small, the schedule executing module 3 may assign the jobs to be executed in computing resources with relatively lower resource priority levels, so as to achieve a higher system throughput.

Continue explaining the first example. The currently available computing resources are computing resources with two resource priorities: Stable_P0 and Unstable_P0; then the scheduling apparatus determines that the computing resource of Stable_P0 is a relatively higher quality resource and assigns the jobs to be executed in the computing resource Stable_P0. If the amount of high quality resources is less than a predetermined threshold, the schedule executing module 3 assigns the jobs to be executed in the computing resource Unstable_P0, so as to achieve a higher resource amount and the throughput.

It needs to be noted that the example above is only for better illustrating the technical solution of the present disclosure, not for limiting the present disclosure. Those skilled in the art should understand that any implementation manner of allocating resources based on the scheduling algorithm and the resource priority levels of the respective computing resources currently available should be included in the scope of the present disclosure.

Preferably, the scheduling apparatus further comprises a module (not shown, hereinafter referred to as "backup module") configured to back up in advance one or more jobs to be executed in a computing resource of an unstable level to other computing resources of stable level for execution.

The backup module backs up in advance one or more jobs to be executed in a computing resource of an unstable level to other computing resources of stable level for execution.

The operation of backing up in advance is for simultaneously running two instances on a certain fragment of a task so as to prevent a slow node from slowing down the progress of the whole job.

Continuing explaining the first example, to prevent that a slow running task running on the Unstable_P0 resource causes the whole job unable to be completed, the backup module backs up in advance a part of the to-be-executed job in Unstable_P0 to the computing resource of Stable_P0, Stable_P1 or Stable_P2 for execution.

According to the method of the present disclosure, by differentiating the priorities of the computing resources and supporting a plurality of scheduling algorithms, resource scheduling is performed based on the variety of scheduling algorithms and resource priorities, which enhances the flexibility of resource scheduling and improves the resource utilization and system throughput.

According to a preferred embodiment of the present disclosure, different computing frames are mixed in the cloud computing system. The scheduling apparatus further comprises a module (not shown, hereinafter referred to as "rules determining module") configured to determine resource scheduling rules corresponding to respective computing frames; a module (not shown, hereinafter referred to as "mixing scheduling module") configured to, when it is needed to schedule resources, allocate resources based on their respective resource scheduling rules and the resource priority levels of the currently available respective computing resources in different computing frameworks, respectively.

The rules determining module determines resource scheduling rules corresponding to respective computing frames.

Wherein, the resource scheduling rules are for indicating the scheduling algorithms employed by a plurality of jobs, respectively.

When it is needed to schedule resources, the mixing scheduling module allocates resources based on their respective resource scheduling rules and the resource priority levels of the currently available respective computing resources in different computing frameworks, respectively.

Preferably, the scheduling apparatus may determine the classification manners of the resource priorities based on factors like importance or time-delay sensitivity degree in different computing frameworks, thereby performs scheduling according to the resource priority classifications corresponding to the computing frameworks in different computing frames.

According to the apparatus of the present embodiment, in the case of mixing different computing frameworks, resource scheduling may be performed based on specific scheduling algorithms in the different computing frameworks, so as to satisfy a plurality of scheduling needs.

According to a preferred embodiment of the present disclosure, the scheduling apparatus further comprises a module (not shown, hereinafter referred to as "transmitting module") configured to transmit the resource-related information and job information of the available computing resources to a remote scheduler; a module (not shown, hereinafter referred to as "receiving module") configured to receive scheduling result information fed back by the remote scheduler, so as to perform corresponding resource allocation based on the scheduling result information.

The transmitting module transmits the resource-related information and job information of the available computing resources to a remote scheduler.

Particularly, the resource-related information includes respective information related to the available computing resources, e.g., the resource priority levels of the available computing resources, the amount of available computing resources, or hardware information of the computing resources, etc.

The receiving module receives scheduling result information fed back by the remote scheduler, so as to perform corresponding resource allocation based on the scheduling result information.

Preferably, the scheduling apparatus executes the operations of transmitting module and receiving module based on user settings, the remote scheduler being included in the device where the user locates.

For example, for user user_1 of the cloud system, the user sets a special scheduling algorithm for his own. For a job of a general user, the scheduling apparatus executes it using a built-in scheduling algorithm; while when it is needed to execute the task corresponding to the user user_1, the transmitting module transmits the resource-related information and job information of the currently available computing resources to the device where the user_1 is located through a remote RPC scheduling interface, and receiving module receives the scheduling result information fed back, so as to allocate corresponding resources based on the scheduling result information.

By scheduling resources through interaction with the remote scheduler, the method according to the present embodiment facilitates the user to use a special scheduling algorithm for resource scheduling, which further enhances the flexibility of resource scheduling.

The software program of the present disclosure may be executed through a processor to implement the steps or functions as mentioned above. The software program (including relevant data structure) of the present disclosure may be stored in a computer readable recording medium, e.g., RAM memory, magnetic or optic driver or soft floppy or similar devices. Additionally, some steps or functions of the present disclosure may be implemented by hardware, for example, a circuit cooperating with the processor so as to implement various steps or functions.

Further, a portion of the present disclosure may be applied as a computer program product, for example, a computer program instruction, which, when executed by the computer, may invoke or provide a method and/or technical solution according to the present disclosure through operations of the computer. Further, the program instruction invoking the method of the present disclosure may be stored in a fixed or mobile recording medium, and/or transmitted through broadcast or data flow in other signal bearer media, and/or stored in a working memory of a computer device which operates based on the program instruction. Here, in an embodiment according to the present disclosure, an apparatus comprises a memory for storing a computer program instruction and a processor for executing the program instruction, wherein when the computer program instruction is executed by the processor, the apparatus is triggered to run the methods and/or technical solutions according to a plurality of embodiments of the present disclosure.

To those skilled in the art, it is apparent that the present disclosure is not limited to the details of the above exemplary embodiments, and the present disclosure may be implemented with other embodiments without departing from the spirit or basic features of the present disclosure. Thus, in any way, the embodiments should be regarded as exemplary, not limitative; the scope of the present disclosure is limited by the appended claims, instead of the above depiction. Thus, all variations intended to fall into the meaning and scope of equivalent elements of the claims should be covered within the present disclosure. No reference signs in the claims should be regarded as limiting the involved claims. Besides, it is apparent that the term "comprise" does not exclude other units or steps, and singularity does not exclude plurality. A plurality of units or modules stated in a system claim may also be implemented by a single unit or module through software or hardware. Terms such as the first and the second are used to indicate names, but do not indicate any particular sequence.

We claim:

1. A method for scheduling computing resources in a cloud system, the method comprising:
determining, according to a stability of one or more computing resources in the cloud system and importance or a time-delay sensitivity degree of the one or more computing resources in a plurality of computing frameworks mixed in the cloud computing system, a respective one or more resource priority levels of the respective one or more computing resources;

differentiating the one or more computing resources into two resource priority levels: stable and unstable, based on the stability of the one or more computing resources of the plurality of computing frameworks, and further categorizing the two resource priority levels into a plurality of stable and unstable priority sub-levels according to degrees of stability;

wherein the method comprises:

selecting a scheduling algorithm from a plurality of scheduling algorithms each corresponding to a different job type, wherein the selected scheduling algorithm corresponds to a current job type, wherein the selecting occurs when it is needed to allocate the one or more computing resources;

allocating the one or more computing resources of a priority sub-level having the highest amount of currently available computing resources required by the selected scheduling algorithm;

executing the current job on the allocated computing resources; and backing up the current job in advance by executing an instance of the current job simultaneously on a computing resource of a higher priority sub-level than the allocated computing resource.

2. The method according to claim 1, wherein the method comprises:

backing up in advance one or more jobs to be executed in a computing resource, from the one or more computing resources, of an unstable level to other of the one or more computing resources of stable level for execution.

3. The method according to claim 1, the method comprising:

determining resource scheduling rules corresponding to each of the plurality of computing frameworks, wherein the resource scheduling rules are for indicating the scheduling algorithms employed by a plurality of jobs, respectively;

when it is needed to allocate the one or more computing resources, allocating the one or more computing resources based on their respective resource scheduling rules and the set of resource priority levels of the set of currently available respective computing resources in different ones of the plurality of computing frameworks, respectively.

4. The method according to claim 1, wherein the method comprises:

transmitting the resource-related information and job information of the available computing resources to a remote scheduler;

receiving scheduling result information fed back by the remote scheduler, so as to perform corresponding resource allocation based on the scheduling result information.

5. A scheduling apparatus for scheduling computing resources in a cloud system, the scheduling apparatus comprising:

at least one processor; and a memory storing instructions, which when executed by the at least one processor, cause the at least one processor to perform operations, the operations comprising: determining, according to a stability of one or more computing resources in the cloud system and importance or a time-delay sensitivity degree of the one or more computing resources in a plurality of computing frameworks mixed in the cloud computing system, a respective one or more resource priority levels of the one or more computing resources;

differentiating the one or more computing resources into two resource priority levels: stable and unstable, based on the stability of the one or more computing resources of the plurality of computing frameworks, and further categorizing the two resource priority levels into a plurality of stable and unstable priority sub-levels according to degrees of stability;

wherein the operations comprises:

selecting a scheduling algorithm from a plurality of scheduling algorithms each corresponding to a different job type, wherein the selected scheduling algorithm corresponds to a current job type, wherein the selecting occurs when it is needed to allocate the one or more computing resources;

allocating the one or more computing resources of a priority sub-level having the highest amount of currently available computing resources required by the selected scheduling algorithm;

executing the current job on the allocated computing resources; and backing up the current job in advance by executing an instance of the current job simultaneously on a computing resource of a higher priority sub-level than the allocated computing resource.

6. The scheduling apparatus according to claim 5, wherein the operations comprise:

backing up in advance one or more jobs to be executed in a computing resource, from the one of the one or more computing resources of an unstable level to other of the one or more computing resources of stable level for execution.

7. The scheduling apparatus according to claim 5, the operations comprising:

determining resource scheduling rules corresponding to respective computing frameworks, wherein the resource scheduling rules are for indicating the scheduling algorithms employed by a plurality of jobs, respectively; and when it is needed to allocate the one or more computing resources, allocating the one or more computing resources based on their respective resource scheduling rules and the resource priority levels of the currently available respective computing resources in different computing frameworks, respectively.

8. The scheduling apparatus according to claim 5, wherein the operations comprise:

transmitting the resource-related information and job information of the available one or more computing resources to a remote scheduler; and receiving scheduling result information fed back by the remote scheduler, so as to perform corresponding resource allocation based on the scheduling result information.

9. A non-transitory computer medium storing a computer program, which when executed by one or more processors, cause the one or more processors to perform operations, the operations comprising:

determining, according to a stability of one or more computing resources in the cloud system and importance or a time-delay sensitivity degree of the one or more computing resources in a plurality of computing frameworks mixed in the cloud computing system, a respective one or more resource priority levels of the respective one or more computing resources;

differentiating the one or more computing resources into two resource priority levels: stable and unstable, based on the stability of the one or more computing resources of the plurality of computing frameworks, and further categorizing the two resource priority levels into a plurality of stable and unstable priority sub-levels according to degrees of stability;

selecting a scheduling algorithm from a plurality of scheduling algorithms each corresponding to a different job type, wherein the selected scheduling algorithm corresponds to a current job type when it is needed to allocate the one or more computing resources;

allocating the one or more computing resources of a priority sub-level having the highest amount of currently available computing resources required by the selected scheduling algorithm;

executing the current job on the allocated computing resources; and backing up the current job in advance by executing an instance of the current job simultaneously on a computing resource of a higher priority sub-level than the allocated computing resource.

* * * * *